US009994234B2

(12) United States Patent
Oguri (10) Patent No.: US 9,994,234 B2
(45) Date of Patent: Jun. 12, 2018

(54) DRIVING ASSISTANCE APPARATUS

(71) Applicant: TOYOTA JIDOSHA KABUSHIKI KAISHA, Toyota-shi, Aichi-ken (JP)

(72) Inventor: Haruki Oguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 14/886,654

(22) Filed: Oct. 19, 2015

(65) Prior Publication Data

US 2016/0176413 A1 Jun. 23, 2016

(30) Foreign Application Priority Data

Dec. 18, 2014 (JP) ................. 2014-256247

(51) Int. Cl.
| | |
|---|---|
| *B60W 20/00* | (2016.01) |
| *B60W 50/14* | (2012.01) |
| *B60W 30/18* | (2012.01) |
| *B60K 35/00* | (2006.01) |
| *B60W 50/00* | (2006.01) |
| *B60W 20/14* | (2016.01) |

(52) U.S. Cl.
CPC ............ *B60W 50/14* (2013.01); *B60K 35/00* (2013.01); *B60W 20/14* (2016.01); *B60W 30/18127* (2013.01); *B60W 30/18136* (2013.01); *B60W 50/0097* (2013.01); *B60K 2350/1096* (2013.01); *B60W 2050/146* (2013.01); *B60W 2520/10* (2013.01); *B60W 2550/146* (2013.01); *B60W 2550/22* (2013.01)

(58) Field of Classification Search
None
See application file for complete search history.

(56) References Cited

U.S. PATENT DOCUMENTS

| | | | | |
|---|---|---|---|---|
| 2006/0290202 A1* | 12/2006 | Shibata | ............ | B60T 7/22 |
| | | | | 303/165 |
| 2009/0234528 A1* | 9/2009 | Crombez | ............ | G07C 5/0825 |
| | | | | 701/31.4 |
| 2009/0243827 A1* | 10/2009 | Burke | ............ | G01D 11/28 |
| | | | | 340/439 |
| 2010/0030413 A1* | 2/2010 | Jinno | ............ | B60K 6/445 |
| | | | | 701/22 |
| 2010/0097202 A1* | 4/2010 | Watanabe | ............ | B60L 11/123 |
| | | | | 340/439 |
| 2010/0211240 A1* | 8/2010 | Crombez | ............ | B60W 10/08 |
| | | | | 701/22 |
| 2010/0228459 A1 | 9/2010 | Mizuno et al. | | |

(Continued)

FOREIGN PATENT DOCUMENTS

| | | |
|---|---|---|
| DE | 102012221726 A1 | 5/2014 |
| EP | 2476596 A1 | 7/2012 |

(Continued)

*Primary Examiner* — Truc M Do
(74) *Attorney, Agent, or Firm* — Oliff PLC (57) ABSTRACT

A driving assistance apparatus outputs a deceleration recommendation indicator as an indicator of recommending deceleration of a vehicle to a display section. The deceleration recommendation indicator recommends deceleration of the vehicle for a target position ahead in the traveling direction of the vehicle. The deceleration recommendation indicator varies in accordance with the speed of the vehicle.

7 Claims, 5 Drawing Sheets

(56) References Cited

U.S. PATENT DOCUMENTS

| | | | | |
|---|---|---|---|---|
| 2011/0015819 A1* | 1/2011 | Goto | B60W 20/13 | 701/31.4 |
| 2011/0125357 A1* | 5/2011 | Harumoto | B60K 6/48 | 701/22 |
| 2011/0137535 A1* | 6/2011 | Goto | B60T 1/10 | 701/70 |
| 2011/0196601 A1* | 8/2011 | Miura | G01C 21/3469 | 701/532 |
| 2011/0241864 A1* | 10/2011 | Fujiki | B60K 35/00 | 340/439 |
| 2012/0004839 A1* | 1/2012 | Mizuno | B60W 50/0097 | 701/123 |
| 2012/0136531 A1 | 5/2012 | Jinno | | |
| 2013/0204472 A1* | 8/2013 | Pfefferl | B60T 1/10 | 701/22 |
| 2013/0211688 A1* | 8/2013 | Oguri | B60W 30/143 | 701/70 |
| 2013/0253750 A1* | 9/2013 | Otake | B60W 10/06 | 701/22 |
| 2013/0282252 A1* | 10/2013 | Takagi | B60T 7/22 | 701/70 |
| 2013/0297173 A1* | 11/2013 | Takagi | G01S 13/862 | 701/70 |
| 2014/0015663 A1* | 1/2014 | Uno | B60W 40/08 | 340/439 |
| 2014/0032029 A1* | 1/2014 | Hirasawa | B60K 6/445 | 701/22 |
| 2014/0058579 A1* | 2/2014 | Ono | G06F 17/00 | 701/1 |
| 2014/0167944 A1* | 6/2014 | Yamaguchi | B60K 37/02 | 340/439 |
| 2014/0285331 A1* | 9/2014 | Otake | G08G 1/16 | 340/435 |
| 2014/0303868 A1* | 10/2014 | Otake | B60T 7/12 | 701/70 |
| 2014/0309903 A1* | 10/2014 | Otake | G08G 1/166 | 701/70 |
| 2014/0379213 A1* | 12/2014 | Otake | G08G 1/09626 | 701/36 |
| 2015/0019057 A1* | 1/2015 | Morisaki | B60L 7/18 | 701/22 |

FOREIGN PATENT DOCUMENTS

| | | |
|---|---|---|
| EP | 2741269 A1 | 6/2014 |
| EP | 2782083 A1 | 9/2014 |
| JP | 2008-114791 A | 5/2008 |
| JP | 5488710 B2 | 5/2014 |
| JP | 2015-154602 A | 8/2015 |

* cited by examiner

DRIVING ASSISTANCE APPARATUS

BACKGROUND OF THE DISCLOSURE

The present disclosure relates to a driving assistance apparatus for a vehicle employing a motor as a driving source.

Conventionally, hybrid vehicles employing an engine and a motor in combination as the driving sources, electric vehicles employing solely a motor as the driving source, and the like are known. With such vehicles, by causing the motor to perform regenerative braking in deceleration or the like, a part of kinetic energy of the vehicle can be recovered as electric energy.

Further, in recent years, aiming to increase the amount of regenerated electricity recovered as electric energy, a driving assistance technique for assisting the driver in driving has also been proposed (e.g., see Japanese Laid-Open Patent Publication No. 2008-114791).

Japanese Laid-Open Patent Publication No. 2008-114791 discloses, as one example of information displaying function of assisting the driver in driving a hybrid vehicle, calculating a predicted regeneration power value based on a vehicle speed and a brake operation amount of the driver. With the hybrid vehicle, when the predicted regeneration power value is greater than a regeneration acceptable power value of a battery, it is predicted that a mechanical brake instead of regenerative braking by the motor will be actuated, and a mechanical brake actuation lamp is turned on. In operating the brake, the driver can learn from the turned-on mechanical brake actuation lamp that the mechanical brake will be possibly actuated.

The above-described information displaying function can inform the driver about information on regenerative braking based on the current brake operation. However, it has not been considered to inform the driver about an energy-efficient deceleration operation before the vehicle is decelerated. Accordingly, the information displaying function intended to increase the regeneration amount is still susceptible to improvement.

SUMMARY

An objective of the present disclosure is to provide a driving assistance apparatus capable of displaying information for increasing a regeneration amount before a deceleration operation is performed.

In accordance with one aspect of the present disclosure, a driving assistance apparatus, which assists a driver in driving a vehicle, is provided. The vehicle includes, as a driving source, a motor capable of regenerating power and an electricity storage device, which is a power source of the motor and capable of being charged by regenerative braking of the motor. The driving assistance apparatus is configured to output a deceleration recommendation indicator as an indicator for recommending deceleration of the vehicle to a display section. The deceleration recommendation indicator recommends deceleration of the vehicle for a target position ahead in a traveling direction of the vehicle. The deceleration recommendation indicator is configured to vary in accordance with a speed of the vehicle.

A regeneration amount obtained by regenerative braking of the motor increases or reduces in accordance with the speed of the vehicle. With the configuration described above, since the deceleration recommendation indicator varies in accordance with the speed of the vehicle, the tendency of the magnitude of the regeneration amount brought about by a decelerating action for a target position can be displayed. Accordingly, by visually recognizing the deceleration recommendation indicator, the driver can obtain the tendency of the magnitude of the regeneration amount brought about by deceleration for a target position.

According to one form of the disclosure, the driving assistance apparatus is configured to display the deceleration recommendation indicator as a regeneration amount per unit travel amount when the vehicle is decelerated solely by regenerative braking of the motor.

With the configuration described above, by visually recognizing the deceleration recommendation indicator, the driver can precisely obtain the magnitude of the regeneration amount brought about by deceleration for a target position.

According to one form of the disclosure, the driving assistance apparatus is configured to output a regeneration state indicator together with the deceleration recommendation indicator to the display section. The regeneration state indicator is an indicator representing a state of regenerative braking of the vehicle. The regeneration state indicator is configured to vary in accordance with braking force requested by the driver of the vehicle. The driving assistance apparatus is configured to match a displaying manner of the regeneration state indicator when an accelerator operation of the vehicle is stopped with a displaying manner of the deceleration recommendation indicator.

In some cases, when an indicator recommending deceleration is displayed, the driver can obtain the tendency of the magnitude of the regeneration amount brought about by deceleration for a target position. However, the driver may not be able to clearly understand what operation is recommended as the deceleration operation. In the configuration described above, when the driver of the vehicle stops an accelerator operation, the regeneration state indicator and the deceleration recommendation indicator are displayed in the same manner. Accordingly, by visually recognizing the regeneration state indicator and the deceleration recommendation indicator shown in the same displaying manner, the driver can determine that cancellation of an accelerator operation has been recommended. Accordingly, information for assisting at regenerative braking can be properly displayed.

According to one form of the disclosure, the deceleration recommendation indicator is configured to represent a difference between a predicted regeneration amount and a regeneration amount per unit travel amount by execution of regenerative braking of the vehicle. The predicted regeneration amount is a regeneration amount per unit travel amount when the vehicle is decelerated solely by regenerative braking by cancellation of an accelerator operation until reaching the target position.

In the configuration described above, when the driver of the vehicle stops an accelerator operation, display is made in a manner representing that there is no difference between the actual regeneration amount and the predicted regeneration amount. Accordingly, by visually recognizing the deceleration recommendation indicator, the driver can determine that cancellation of an accelerator operation has been recommended. Accordingly, information for assisting at regenerative braking can be properly displayed.

According to one form of the disclosure, the driving assistance apparatus is configured to hide the deceleration recommendation indicator on condition that a brake operation is performed after the vehicle has passed through a point where deceleration needs to be started.

In the configuration described above, when the driver performs a brake operation after having passed through the point where deceleration needs to be started, the deceleration recommendation indicator is hidden. Accordingly, for example, when a brake operation is performed in accordance with the relative distance to a vehicle ahead, the assistance of recommending deceleration can be ended.

According to one form of the disclosure, the driving assistance apparatus is configured to hide the deceleration recommendation indicator on condition that the vehicle has passed through a target position that is a target of deceleration.

In the configuration described above, when the vehicle has passed through the position that is the target of deceleration, the deceleration recommendation indicator is hidden based on the fact that assistance of recommending cancellation of an accelerator operation has ended. Accordingly, the driver can determine that the deceleration recommendation indicator has been displayed for assisting at a decelerating action of the vehicle for the target position.

According to one form of the disclosure, the driving assistance apparatus is configured to calculate time of outputting the deceleration recommendation indicator to the display section by adding a second travel amount to a travel amount traveled by the vehicle until the speed of the vehicle reaches a target speed. The second travel amount is a travel amount traveled by the vehicle from when the deceleration recommendation indicator is output to the display section until the driver cancels an accelerator operation.

In the configuration described above, on the display section, the deceleration recommendation indicator is displayed at the time where the driver, having visually recognized the indicator of the deceleration recommendation indicator, can arrive at the position that is a deceleration target at a target speed by cancellation of an accelerator operation. Accordingly, when the operation is performed in accordance with the deceleration recommendation indicator, the time during which regenerative braking is performed can be increased, and the regenerated power amount can be increased. A reduction in use of the mechanical brake suppresses loss of kinetic energy of the vehicle by being converted into heat. This also contributes toward an increase in the regenerated power amount.

Other aspects and advantages of the disclosure will become apparent from the following description, taken in conjunction with the accompanying drawings, illustrating by way of example the principles of the disclosure.

BRIEF DESCRIPTION OF THE DRAWINGS

The preferred embodiments, together with objects and advantages thereof, may best be understood by reference to the following description together with the accompanying drawings in which.

DETAILED DESCRIPTION OF THE PREFERRED EMBODIMENTS

First Embodiment

In the following, a driving assistance apparatus according to a first embodiment will be described with reference to FIGS. 1 to 9. In the present embodiment, the driving assistance apparatus is mounted on a hybrid vehicle 1.

Figure 1:
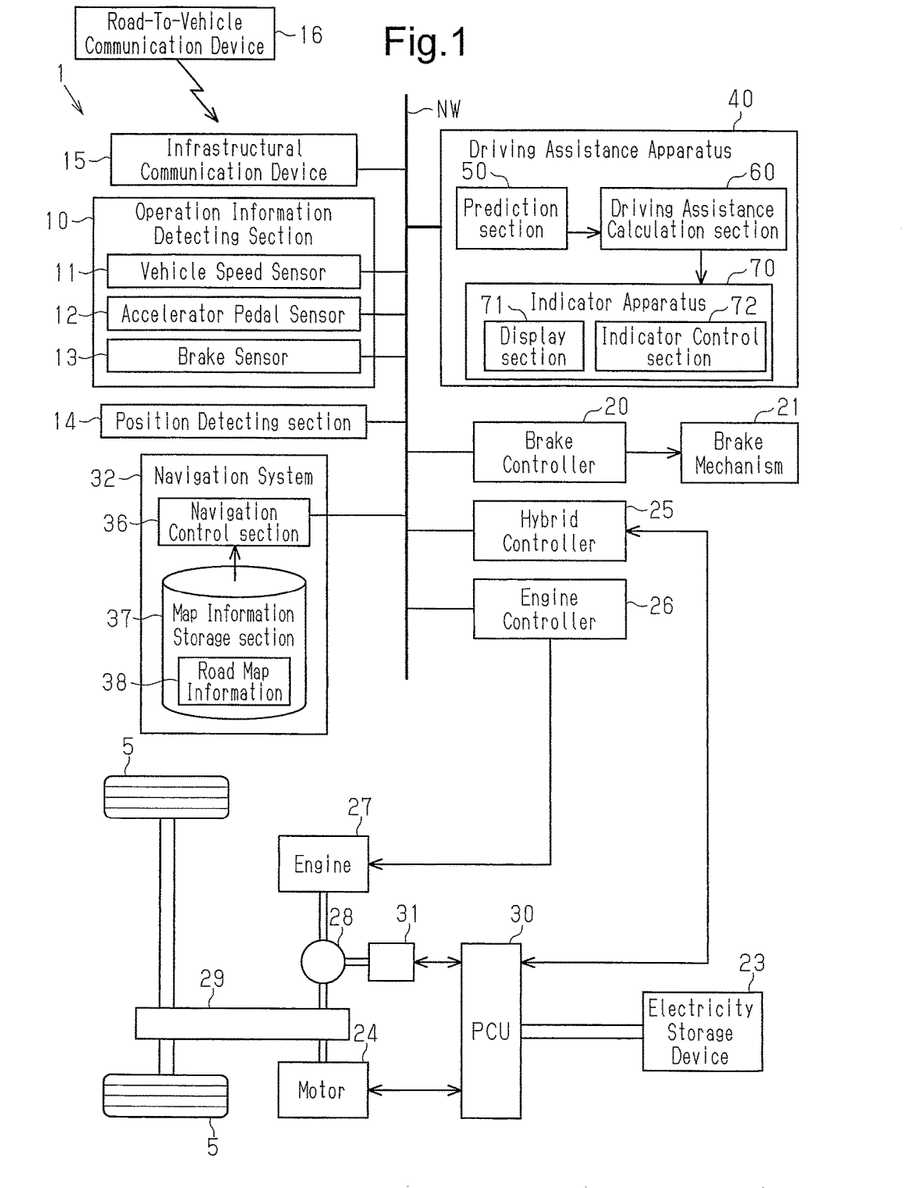
FIG. 1 is a block diagram of a vehicle that includes a driving assistance apparatus according to a first embodiment of the present disclosure.

With reference to FIG. 1, the schematic structure of the vehicle 1 will be described. The vehicle 1 includes an engine 27 and a motor 24 as the driving sources. The engine 27 is mechanically coupled to wheels 5 via a power split mechanism 28 and a reduction gear mechanism 29. The engine 27 is coupled, via the power split mechanism 28, to a generator 31, which converts a part of power of the engine 27 into electricity.

The motor 24 is supplied with electricity from an electricity storage device 23, which is the power source, via a power control unit (PCU) 30, which includes an inverter section, a boost converter section and the like. The electricity storage device 23 is a rechargeable battery. The motor 24 is mechanically coupled to the wheels 5 via the reduction gear mechanism 29, and functions as an electric motor that transmits rotary force to the wheels 5. The motor 24 functions also as a generator. The motor 24 performs regenerative braking, i.e., provides braking force to the wheels 5, by generating electricity by the rotary force transmitted from the wheels 5.

The vehicle 1 includes a hybrid controller 25 that controls a hybrid system including the engine 27 and the motor 24, and an engine controller 26 that controls the driving state of the engine 27. The hybrid controller 25 and the engine controller 26 are connected to an in-vehicle network NW such as a controller area network (CAN) and each include a computer having a calculation section and a storage section. The calculation section processes programs and parameters stored in the storage section, thereby executing various kinds of control.

The vehicle 1 includes a mechanical brake mechanism 21, which provides braking force other than regenerative braking to the wheels. The brake mechanism 21 is, for example, a hydraulic brake system. The brake mechanism 21 provides braking force to the wheels 5 by friction with the wheels 5, thereby changing kinetic energy of the vehicle 1 into heat.

The brake mechanism 21 is controlled by the brake controller 20. The brake controller 20 is connected to the in-vehicle network NW and includes a computer having a calculation section and a storage section. The calculation section processes programs and parameters stored in the storage section, thereby executing control of various kinds.

The vehicle 1 includes an operation information detecting section 10 for detecting vehicle operations performed by the driver. The operation information detecting section 10 includes a vehicle speed sensor 11, an accelerator pedal sensor 12, and a brake sensor 13. The vehicle speed sensor 11 detects the vehicle speed, which is the rotation speed of the wheels. The accelerator pedal sensor 12 detects whether or not the driver is pressing down the accelerator pedal, and an accelerator pedal operation amount, which is the pressed-down amount of the accelerator pedal. The brake sensor 13 detects whether or not the driver is pressing down the brake pedal, and a brake operation amount, which is the pressed-down amount of the brake pedal. The vehicle speed sensor 11, the accelerator pedal sensor 12, and the brake sensor 13 are connected to the in-vehicle network NW.

Based on the accelerator pedal operation amount input from the accelerator pedal sensor 12, the hybrid controller 25 calculates a requested driving force, which is a driving force requested by the driver. The hybrid controller 25 calculates assignment of the requested driving force to the engine 27 and the motor 24. Based on the assignment of the driving force, the hybrid controller 25 outputs instructions to the engine controller 26, and controls the driving state of the motor 24 via the PCU 30.

The brake controller 20 and the hybrid controller 25 perform cooperative control under which both the brake mechanism 21 and the motor 24 are used. For example, the brake controller 20 calculates a requested braking force, which is the braking force requested by the driver, based on the brake operation amount input from the brake sensor 13. The brake controller 20 calculates assignment of the requested braking force to the brake mechanism 21 and the motor 24. Assignment of the braking force to the brake mechanism 21 and the motor 24 is determined based on the vehicle state such as a brake operation amount per unit time, the vehicle speed immediately before deceleration is started, the charge rate of the electricity storage device 23 and the like.

The deceleration caused by regenerative braking is relatively smaller than the deceleration caused by the brake mechanism 21. Therefore, the brake mechanism 21 is actuated at hard braking. The brake mechanism 21 is also actuated when a great braking force is required while the vehicle 1 is running at high speeds. Also when the electricity storage device 23 is nearly fully charged, the braking force is not assigned to the motor 24 and the brake mechanism 21 is actuated.

Based on the calculated assignment, the brake controller 20 calculates a braking amount of the brake mechanism 21 and a regenerative braking amount of the motor 24. When braking force is assigned to the motor 24, the brake controller 20 outputs a regeneration request to the hybrid controller 25 with a regenerative braking amount. The hybrid controller 25 controls the motor 24 based on the regenerative control amount and via the PCU 30. When braking force is assigned to the brake mechanism 21, the brake controller 20 controls the actuation state of the brake mechanism 21 based on the calculated braking amount.

The vehicle 1 includes a position detecting section 14, which detects the current position of the vehicle 1. The position detecting section 14 includes an antenna for satellite-based navigation, e.g., global positioning system (GPS) antenna, and calculates the position represented by latitude and longitude or the like. The position detecting section 14 is connected to the in-vehicle network NW, and outputs information indicative of the current position.

The vehicle 1 has an infrastructural communication device 15, which performs road-to-vehicle communications. The infrastructural communication device 15 is a communication device that communicates with a road-to-vehicle communication device 16 installed on the road via optical signals such as infrared rays, and communicates wirelessly with other vehicles having a wireless communication function.

The road-to-vehicle communication device 16 is installed, for example, at a position before an intersection where traffic lights are installed. The road-to-vehicle communication device 16 transmits information including at least one of the distance to the intersection, the signaling cycle of the traffic light at the intersection, the stop line position, and the longitudinal gradient and superelevation of the road as an infrastructural information signal.

The infrastructural communication device 15 of the vehicle 1 receives an infrastructural information signal transmitted from, for example, the road-to-vehicle communication device 16, and outputs the received infrastructural information signal to the driving assistance apparatus 40 via the in-vehicle network NW.

The infrastructural communication device 15 receives road traffic information delivered from the VICS (registered trademark) center via the road-to-vehicle communication device 16. The road traffic information includes, for example, a congested section and the congestion, traffic regulation information such as road closure, and speed regulation information.

The vehicle 1 includes a navigation system 32, which has a navigation control section 36 and a map information storage section 37. The navigation control section 36 calculates, based on the vehicle speed acquired from the vehicle speed sensor 11 and the direction acquired from a direction sensor (not shown), the current position of the vehicle 1 by autonomous navigation. The navigation control section 36 identifies the current position using the calculated current position and the current position acquired from the position detecting section 14.

In the map information storage section 37, road map information 38 is registered. The road map information 38 is information related to maps, and includes route-search information, road-associated information and the like.

The route-search information is information constituted by branch information and the like, which are not directly related to the road shape, and chiefly used in calculating (route searching) a recommended route. The road-associated information includes information such as positions where traffic lights are installed, position of intersections where traffic lights are installed, positions of intersection with no traffic lights, temporary stop positions, railroad crossings, road shapes, tunnels, crosswalks, road surface states and the like.

The vehicle 1 includes a driving assistance apparatus 40 for displaying information for assisting at regenerative braking. The driving assistance apparatus 40 is connected to the in-vehicle network NW, and acquires information output from the operation information detecting section 10, the infrastructural communication device 15, the navigation system 32 and the like.

Next, a detailed description will be given of the driving assistance apparatus 40. The driving assistance apparatus 40 includes a computer that has a calculation section and a storage section. The calculation section processes programs and parameters stored in the storage section, thereby executing various kinds of control. The calculation section and the storage section may be composed of circuitry and ECUs.

The driving assistance apparatus 40 recommends deceleration by an accelerator-release operation, which is an operation of cancelling an accelerator operation, for a target position, which is the target of deceleration. That is, when the vehicle 1 can arrive at the target position at a target speed by regenerative braking of the motor 24 based on an accelerator-release operation, the driving assistance apparatus 40 outputs an indicator that recommends an accelerator-release operation to a display device 70.

Depending on a brake operation amount per unit time and the like, even when a brake operation is performed, it may be possible to decelerate to a target speed solely by regenerative braking of the motor 24 without actuating the brake mechanism 21. However, when the brake pedal is operated, it means that braking force requested by the driver is great. Therefore, the brake controller 20 controls the actuation state of the brake mechanism 21 and the motor 24 to increase the deceleration of the vehicle 1 than when an accelerator-release operation is performed.

Accordingly, if a brake operation is recommended as the deceleration operation to a target position, depending on the brake operation amount of the driver and the time of the brake operation, the vehicle speed may approximate the target speed before arriving at the target position, and the likelihood of necessity of acceleration before the target position increases. When acceleration is performed under such a situation where deceleration should be performed, at least one of the engine 27 and the motor 24 is driven, and at least one of power consumption in the form of electricity consumption and fuel consumption decreases. Accordingly, by recommending an accelerator-release operation before a target position, acceleration before the target position is suppressed and a regenerated electricity amount is increased.

The driving assistance apparatus 40 includes a prediction section 50, a driving assistance calculation section 60 as a regeneration amount prediction section, and the display device 70. The prediction section 50 detects a target position, and predicts the necessity for deceleration at the target position.

The prediction section 50 acquires the current position from the navigation control section 36. The prediction section 50 acquires infrastructural information from the infrastructural communication device 15, or acquires road map information 38 of the area around the current position from the navigation system 32. The prediction section 50 detects a target position where deceleration is required using the acquired infrastructural information or road map information 38. As the target position, for example, a traffic element such as an intersection where traffic lights are provided, an intersection with a temporary stop line, a railroad crossing, a place where a warning sign such as "right turn ahead" or "left turn ahead" is posted, and a curve with a small radius of curvature and the like is set. The target position may be a point located at the center of the traffic element. Alternatively, the target position may be located before a traffic element such as a stop, line, or may be the origin of such a traffic element.

When a travel route from the departure place to the destination place is set to the vehicle 1, the prediction section 50 detects any target position present in the traveling route based on the acquired road map information 38.

When the prediction section 50 detects a target position ahead in the traveling direction of the vehicle 1, the prediction section 50 predicts the necessity for deceleration at the target position. For example, when the target position is an intersection with traffic lights, the prediction section 50 recognizes the distance from the traffic light to the vehicle 1, and the signaling cycle of the traffic light based on the acquired infrastructural information and the like. The prediction section 50 predicts whether or not deceleration of the vehicle 1 will be necessary based on the vehicle speed, the distance to the traffic light, and the signaling cycle of the traffic light.

When the target position is an intersection with a temporary stop line and without traffic lights, a place where a warning sign is posted, a curve with a small radius of curvature or the like, the prediction section 50 predicts that deceleration is necessary without using the infrastructural information.

When the prediction section 50 predicts the necessity for deceleration for the target position in this manner, the prediction section 50 outputs information on the target position and the prediction result as to the target position to the driving assistance calculation section 60. The driving assistance calculation section 60 may be composed of a processor circuitry and ECUs.

The prediction section 50 has a function of learning vehicle operations performed by the driver. When the driver of the vehicle 1 performs a deceleration operation, the prediction section 50 identifies the target position to which the operation has been performed. The deceleration operation includes cancellation of an accelerator operation, and a brake operation. The prediction section 50 learns the performed driving operation, the speed of the vehicle 1 when the operation is performed, and the target position in association with one another.

The prediction section 50 can also identify the target position based on such a learning result in addition to the infrastructural information and the road map information 38, and predict the necessity for deceleration for the target position.

The driving assistance calculation section 60 calculates the drive assistance mode that needs to be executed for the driver of the vehicle 1, based on the prediction result acquired from the prediction section 50. When the prediction section 50 predicts that deceleration for a target position is necessary, the driving assistance calculation section 60 determines whether or not deceleration can be achieved by regenerative braking by an accelerator-release operation until reaching the target position, and calculates the time of recommending the accelerator-release operation. The driving assistance calculation section 60 predicts a regenerated electricity amount brought about by the accelerator-release operation.

In determining whether or not deceleration can be achieved solely by regenerative braking by an accelerator-release operation until reaching the target position, first, the driving assistance calculation section 60 acquires information indicative of whether or not regenerative braking is possible from the hybrid controller 25 and the like. For example, the hybrid controller 25 stops regenerative braking when the electricity storage device 23 is nearly fully charged; and the hybrid controller 25 determines that regenerative braking is possible when the available capacity is equal to or greater than a predetermined amount.

When the driving assistance calculation section 60 determines that regenerative braking is possible, the driving assistance calculation section 60 acquires a regenerative deceleration $\alpha$, which is the deceleration of the vehicle 1 with the accelerator released. In the storage section of the driving assistance apparatus 40 and the like, the deceleration of the vehicle 1 is determined in association with variables representing the running state, such as the actuation state of regenerative braking by the motor 24, the vehicle speed, the driving state of the engine 27, the brake operation amount, and the like. The driving assistance calculation section 60 acquires the deceleration when regenerative braking is actuated with the accelerator released, from the storage section in which the deceleration corresponding to each situation is predetermined. The deceleration acquired at this time is regarded as the deceleration brought about by regenerative braking of the motor 24.

Alternatively, the driving assistance calculation section 60 may calculate the regenerative deceleration α based on the specification of the motor 24 and the electricity storage device 23 stored in the driving assistance calculation section 60, or may acquire information required for calculating the regenerative deceleration α from the brake controller 20, the PCU 30 and the like.

For example, when the vehicle 1 arrives at a position short of the target position by a predetermined distance, the driving assistance calculation section 60 calculates, using the vehicle speed, the deceleration required for decelerating the vehicle 1 such that the vehicle 1 will run at the target speed at the target position. The driving assistance calculation section 60 compares the calculated deceleration and the regenerative deceleration α against each other. When the calculated deceleration is equal to or smaller than the regenerative deceleration α, the driving assistance calculation section 60 determines that the vehicle speed can achieve the target speed at the target position by deceleration solely by an accelerator-release operation.

In contrast, when the calculated deceleration is greater than the regenerative deceleration α, the vehicle speed will not achieve the target speed at the target position by deceleration solely by an accelerator-release operation. In this case, in order for the vehicle 1 to arrive at the target position at the target speed, the brake mechanism 21 is used.

Next, with reference to FIGS. 2 and 3, a function of calculating the time of recommending an accelerator-release operation will be described while showing a specific example.

Figure 2:
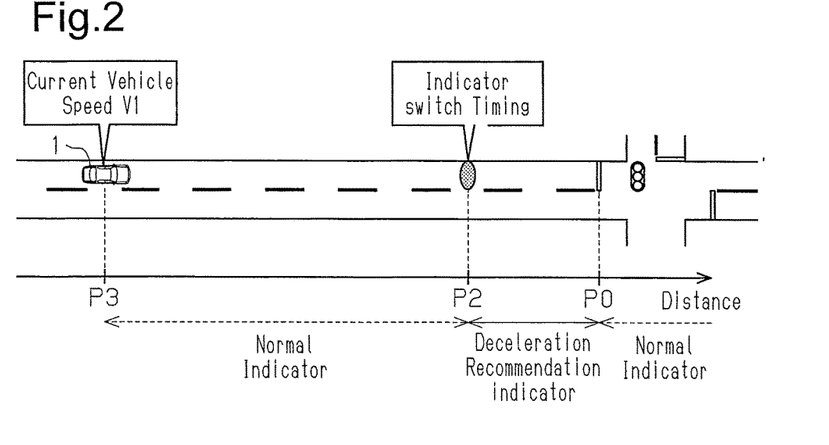
FIG. 2 is a plan view showing the relationship between the position of the vehicle when the vehicle is stopping at a target position and a displaying manner of the display section shown in FIG. 1.

As shown in FIG. 2, a case will be described in which a target position P0, which is the deceleration target, is set at an intersection where traffic lights are installed. It is assumed that the vehicle 1 is running from a current position P3 toward the target position P0 at a vehicle speed V1. It is assumed that the prediction section 50 has determined that there is the necessity for the vehicle 1 to stop at the target position P0 based on at least one of the infrastructural information signal, the road map information 38, and the learning function of the prediction section 50.

When the driving assistance calculation section 60 determines that deceleration can be achieved by solely regenerative braking by an accelerator-release operation for the target position, the driving assistance calculation section 60 calculates a deceleration distance D1 that is required for decelerating the current vehicle speed V1 to a target speed V2 (V2<V1) by the regenerative deceleration α. The target speed V2 may be 0 km/h, or may be the speed higher than 0 km/h. That is, the deceleration distance D1 is a travel amount traveled by the vehicle 1 until the speed of the vehicle 1 reaches the target speed.

The deceleration distance D1 is calculated by the following Equation (1). In Equation (1), V1 is the current vehicle speed, V2 is the target speed, and a is the regenerative deceleration, which is a negative value.

$$D1=\{(V2)^2-(V1)^2\}/(2\alpha) \tag{1}$$

Figure 3:
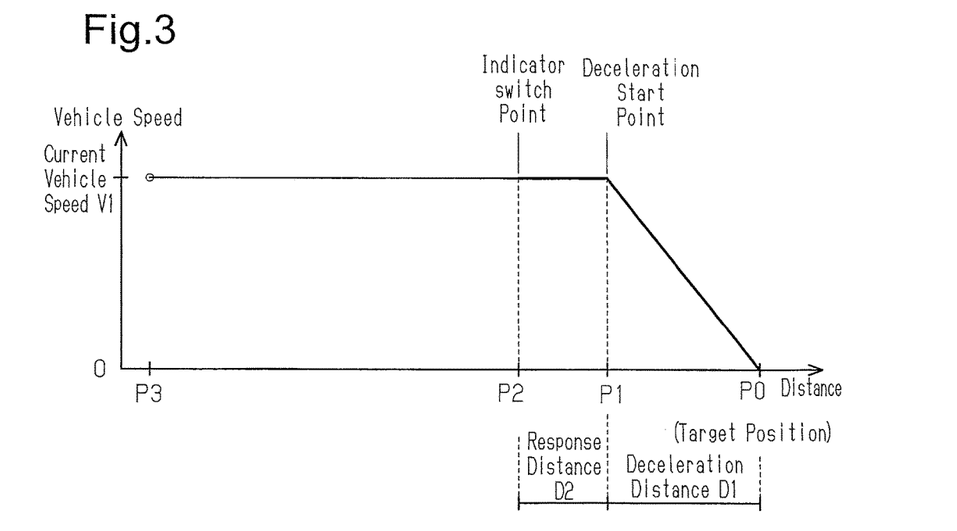
FIG. 3 is a graph describing calculation of time at which a displaying manner of the display section shown in FIG. 2 is changed.

As shown in FIG. 3, when the driving assistance apparatus 40 has calculated the deceleration distance D1, the driving assistance apparatus 40 determines the position short of the target position P0 by the deceleration distance D1 to be a deceleration start point P1, where the accelerator-release operation should be started.

Subsequently, the driving assistance calculation section 60 calculates a response distance D2, which is the distance traveled by the vehicle from when an indicator recommending the accelerator-release operation is output to the display device 70 until the driver recognizes the indicator and performs the accelerator-release operation. The response distance D2 is a second travel amount that is calculated based on the following Equation (2). In Equation (2), T1 is the response time and V1 is the current vehicle speed.

$$D2=T1 \cdot V1 \tag{2}$$

When the driving assistance calculation section 60 has calculated the response distance D2, the driving assistance calculation section 60 determines a position short of the deceleration start point P1 by the response distance D2 to be an indicator switch point P2 where the accelerator-release operation is recommended.

As shown in FIG. 2, when the vehicle 1 has arrived at the display switch point P2, the driving assistance calculation section 60 causes the display device 70 to display a deceleration recommendation indicator, which is an indicator informing that the vehicle 1 can be stopped at the target position P0 solely by regenerative braking. When the position of the vehicle 1 is short of the indicator switch point P2, the driving assistance calculation section 60 causes the display device 70 to display a normal indicator, which is different from the deceleration recommendation indicator.

Next, a description will be given of a function of predicting a regenerated electricity amount brought about by an accelerator-release operation. The driving assistance calculation section 60 calculates a predicted regenerated electricity amount E2, which is a regenerated electricity amount per unit travel amount when the vehicle is decelerated solely by regenerative braking by an accelerator-release operation until reaching the target position. The driving assistance calculation section 60 also calculates a regenerated electricity amount E1, which represents a regenerated electricity amount per current unit travel amount. That is, the regenerated electricity amount E1 represents a regeneration amount per unit travel amount brought about by execution of regenerative braking of the vehicle. A unit time is used as the unit travel amount. The section of the regenerated electricity amount E1 and that of the predicted regenerated electricity amount E2 are identical, and for example the section is kW. The regenerated electricity amount E1 and the predicted regenerated electricity amount E2 may each represent a regenerated electricity amount per unit travel distance.

When the driving assistance calculation section 60 determines that regenerative braking is being executed based on information acquired from the hybrid controller 25, the brake controller 20 or the like, the driving assistance calculation section 60 acquires the deceleration corresponding to the running state of the vehicle 1 from the storage section of the driving assistance apparatus 40 or the like.

At this time, when the driving assistance calculation section 60 determines that the brake mechanism 21 is operating in addition to regenerative braking of the motor 24, the driving assistance calculation section 60 corrects, based on the assignment of braking force to the brake mechanism 21 and the motor 24, the deceleration in accordance with the assignment to the motor 24, to obtain a deceleration β generated by regenerative braking. Alternatively, the driving assistance calculation section 60 may calculate the deceleration β generated by regenerative braking of the motor 24 based on the specification of the motor 24 and that of the electricity storage device 23, or may acquire information required for calculating the deceleration β brought about by regenerative braking from the brake controller 20 or the PCU 30.

The driving assistance calculation section 60 estimates the regenerated electricity amount E1 using the acquired or corrected deceleration β and in accordance with the following Equation (3). In Equation (3), V1 is the current vehicle speed, and M is the weight of the vehicle.

$$E1 = v1 \cdot \beta \cdot M/1000 \quad (3)$$

The driving assistance calculation section 60 calculates a proportion R1 (%) of regenerated electricity amount E1 to a maximum regenerated electricity amount Emax in accordance with the following Equation (4). The maximum regenerated electricity amount Emax represents the maximum regenerated electricity amount that can be recovered by the regenerative braking of the motor 24.

$$R1 = (E1/E\text{max}) \cdot 100 \quad (4)$$

The driving assistance calculation section 60 calculates the predicted regenerated electricity amount E2 as a predicted regeneration amount with the accelerator released using the regenerative deceleration α, which is the deceleration of the vehicle 1 with the accelerator released, in accordance with the following Equation (5). In Equation (5), V1 is the current vehicle speed, and M is the weight of the vehicle.

$$E2 = V1 \cdot \alpha \cdot M/1000 \quad (5)$$

The driving assistance calculation section 60 calculates a proportion R2 (%) of the predicted regenerated electricity amount E2 to the maximum regenerated electricity amount Emax in accordance with the following Equation (6).

$$R2 = (E2/E\text{max}) \cdot 100 \quad (6)$$

When the driver is performing a brake operation, the braking force assigned to the motor 24 tends to be great. Therefore, the deceleration β tends to exceed the regenerative deceleration α. On the other hand, when an accelerator-release operation is performed by the driver, since the regenerative deceleration α is the deceleration with the accelerator released, the deceleration and the regenerative deceleration α assume an identical value. As a result, the regenerated electricity amount E1 and the predicted regenerated electricity amount E2 agree with each other.

When the driving assistance calculation section 60 has calculated the proportion R1 of the regenerated electricity amount E1 to the maximum regenerated electricity amount Emax and the proportion R2 of the predicted regenerated electricity amount E2 to the maximum regenerated electricity amount Emax, the driving assistance calculation section 60 outputs an instruction to output an indicator based on the proportion R1 and an indicator based on the proportion R2 to the display device 70 with the values of the proportion R1 and the proportion R2. The calculation and output of the proportion R1 are performed for each predetermined running distance or each predetermined time. Alternatively, the calculation and output of the proportion R1 may be performed at the timing of detecting a change in the vehicle speed or in the drive operation. Each time the proportion R1 is calculated and output, the proportion R2 is also calculated.

Next, a description will be given of the display device 70 of the driving assistance apparatus 40. The display device 70 includes a display section 71 that visualizes information on the energy state of the vehicle, and an indicator control section 72 that controls the displaying manner of the display section 71.

The display section 71 is provided at the position that can be visually recognized by the driver of the vehicle 1. For example, the display section 71 is a thin-type display in the console, a head-up display provided at the windshield or near the windshield, or a display of the navigation system 32. Further, the display section 71 is a so-called hybrid system indicator, and displays the actuation status of the hybrid system including the engine 27, the motor 24 and the like, together with the fuel consumption, the remaining battery level and the like.

The actuation status of the hybrid system includes indicator of information representing the operating state of the engine 27, information representing the operating state of the motor 24, and the information representing the regenerating state of the motor 24 and the like. On the display section 71, in addition to the actuation status of the hybrid system, a deceleration recommendation indicator that recommends the driver to decelerate the vehicle 1 is visually displayed.

Figure 4:
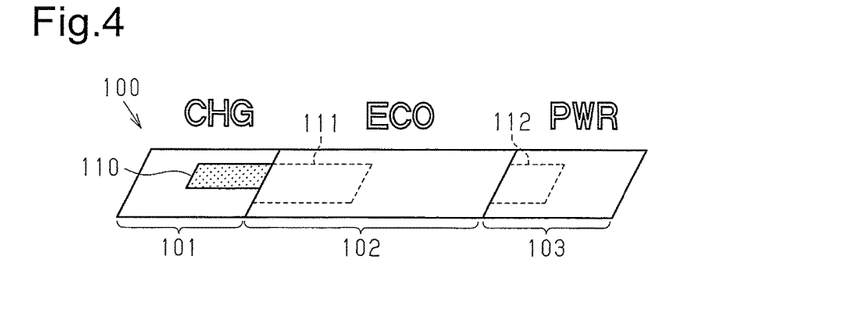
FIG. 4 is a diagram showing the structure of a level meter displayed on the display section in FIG. 1.

With reference to FIG. 4, a description will be given of an indicator of the actuation status of the hybrid system. On the display section 71, a level meter 100, which represents the operating state of the engine and the operating state and the regenerating state of the motor 24, is displayed.

The level meter 100 includes a charge (CHG) region 101, which indicates that the motor 24 is regeneratively driving, an eco (ECO) region 102, which indicates that the vehicle 1 is being driven by the motor 24, and a power (PWR) region 103, which indicates that the engine 27 is being driven. The PWR region 103 may be a region that indicates that the engine 27 is solely driving, or may be a region that indicates that the engine 27 and the motor 24 are cooperatively operating. The CHG region 101, the ECO region 102, and the PWR region 103 are arranged in a row.

In the CHG region 101, a regeneration state indicator 110, which represents the current state of regenerative braking, is displayed. Since the regenerative braking varies in accordance with the braking force requested by the driver, the regeneration state indicator 110 also varies in accordance with the requested braking force. The regeneration state indicator 110 is a bar-like graph, and represents by its length the proportion R1 of the regenerated electricity amount E1 to the maximum regenerated electricity amount Emax calculated by the driving assistance calculation section 60. In this manner, by the proportion R1 of the regenerated electricity amount E1 to the maximum regenerated electricity amount Emax, the driver can obtain the approximate current regeneration amount. In FIG. 4, the right end of the CHG region 101 corresponds to the proportion R1 of 0%, where the regenerated electricity amount E1 is 0. The left end of the CHG region 101 corresponds to the proportion R1 of 100%, where the regenerated electricity amount E1 is the maximum regenerated electricity amount Emax.

For example, when an accelerator operation such as pressing-down of the accelerator pedal is performed and the requested braking force is 0, the proportion R1 is 0% and the regeneration state indicator 110 is hidden. When an accelerator-release operation, in which the operation amount of the accelerator pedal is 0, is performed and regenerative braking by the motor 24 is executed, the regeneration state indicator 110 appears by the length corresponding to the regenerated electricity amount with the accelerator released. When a brake operation such as pressing-down of the brake pedal is performed and the braking force assigned to the motor 24 becomes greater than that with the accelerator released, the regeneration state indicator 110 becomes further longer than that with the accelerator released.

In the ECO region 102, when the motor 24 is driving, a motor output indicator 111, which is represented by a broken line in the drawing, is displayed. The indicator control section 72 represents the magnitude of the output of the motor 24 by the length of the motor output indicator 111.

The PWR region 103 is a region for indicating that the engine 27 is being driven. When the engine 27 is being driven, in the PWR region 103, a bar-like engine output indicator 112, which is represented by a broken line in the drawing, is displayed. The indicator control section 72 represents the magnitude of the output of the engine 27 by the length of the engine output indicator 112.

Based on the proportion R2 acquired from the driving assistance calculation section 60, the indicator control section 72 displays the deceleration recommendation indicator based on the proportion R2 on the display section 71.

With reference to FIGS. 5 to 8, a description will be given of a deceleration recommendation indicator 115. When solely the deceleration recommendation indicator based on the proportion R2 is simply displayed, though the driver can obtain the tendency of the magnitude of the regeneration amount brought about by deceleration for a target position, an operation recommended as the deceleration operation may be unclear. Accordingly, the deceleration recommendation indicator and the regeneration state indicator 110 are displayed such that they can be compared against each other, thereby allowing the driver to easily notice the recommended deceleration operation.

Figure 5:
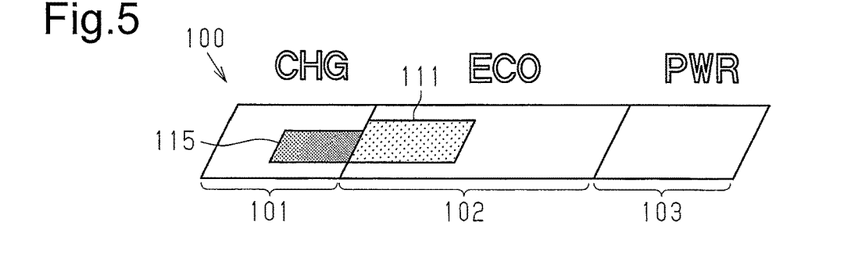
FIG. 5 shows a display example of the level meter shown in FIG. 4, when the level meter starts deceleration recommending assistance, in which neither an accelerator-release operation nor a brake operation is being performed.

As shown in FIG. 5, when the indicator control section 72 acquires the proportion R2 of the predicted regenerated electricity amount E2 to the maximum regenerated electricity amount Emax, the indicator control section 72 displays on the CHG region 101 the deceleration recommendation indicator 115, which corresponds to the magnitude of the proportion R2. The deceleration recommendation indicator 115 is displayed when the vehicle 1 arrives at the indicator switch point P2. The level meter 100 shown in FIG. 5 is one example of indicator, and is the level meter 100 in the state where the motor 24 is driven by being supplied with electricity from the electricity storage device 23, and regenerative braking is not executed.

The deceleration recommendation indicator 115 is a bar-like indicator. The deceleration recommendation indicator 115 is displayed to be distinguishable from the regeneration state indicator 110, and adjacent to the regeneration state indicator 110. For example, while the deceleration recommendation indicator 115 is displayed in the same pattern as to the shape or the like as the regeneration state indicator 110, the deceleration recommendation indicator 115 is displayed in a different pattern as to color, tone, texture or the like from the regeneration state indicator 110. Since the regenerated electricity amount increases as the vehicle speed becomes higher, the deceleration recommendation indicator 115 becomes longer as the vehicle speed becomes higher.

Figure 6:
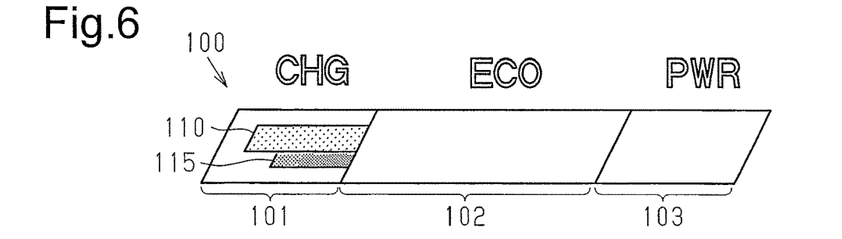
FIG. 6 shows, on the level meter shown in FIG. 4, a state where a brake operation is being performed.

As shown in FIG. 6, when the deceleration recommendation indicator 115 has been displayed and the assignment of the braking force to the motor 24 has become greater than that with the accelerator released by the driver performing a brake operation before arriving at the deceleration start point P1, the regeneration state indicator 110 becomes longer than the deceleration recommendation indicator 115.

In contrast, depending on the brake operation amount when the vehicle is running at high speeds or the like, the assignment of the braking force to the brake mechanism 21 may be greater. In such a case where the assignment of the braking force to the motor 24 is greater than that with the accelerator released, the regeneration state indicator 110 becomes shorter than the deceleration recommendation indicator 115.

The driver intuitively understands that the brake operation amount is not the operation amount recommended by the driving assistance apparatus 40, or the brake operation itself is not the operation recommended by the driving assistance apparatus 40, by visually recognizing that the length of the regeneration state indicator 110 is different from that of the deceleration recommendation indicator 115. When the length of the regeneration state indicator 110 is different from that of the deceleration recommendation indicator 115, the driver subconsciously tries to match the length of the regeneration state indicator 110 with that of the deceleration recommendation indicator 115.

Figure 7:
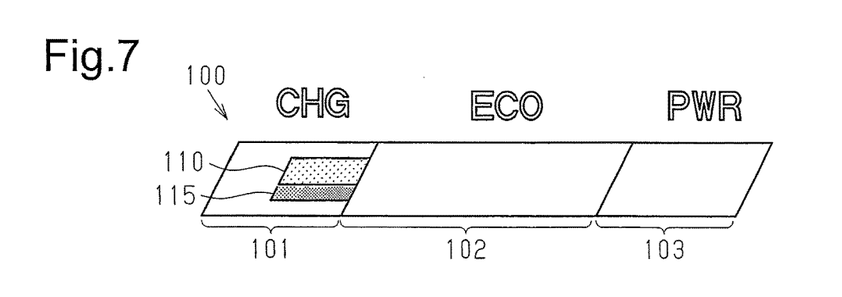
FIG. 7 shows, on the level meter shown in FIG. 4, a state with the accelerator released.

As shown in FIG. 7, when an accelerator-release operation is performed by the driver, the regenerated electricity amount E1 and the predicted regenerated electricity amount E2 become identical to each other, and therefore the displaying manner of the regeneration state indicator 110 and that of the deceleration recommendation indicator 115 are matched with each other. In the present embodiment, the length of the regeneration state indicator 110 and that of the deceleration recommendation indicator 115 are matched with each other. In the drawing, the left end of the regeneration state indicator 110 and that of the deceleration recommendation indicator 115 are matched with each other.

The driver intuitively understands that the deceleration recommendation indicator 115 is the indicator of recommending the accelerator-release operation, by visually recognizing the state where the length of the regeneration state indicator 110 and that of the deceleration recommendation indicator 115 are matched with each other.

Once the accelerator-release operation is performed and thereafter the accelerator-release operation is maintained, the regenerated electricity amount E1 gradually reduces as the vehicle speed gradually becomes lower. Accordingly, when the accelerator-release operation is maintained, the length of the regeneration state indicator 110 and that of the deceleration recommendation indicator 115 gradually become shorter while the state where the length of the regeneration state indicator 110 and that of the deceleration recommendation indicator 115 are matched with each other is maintained.

Figure 8:
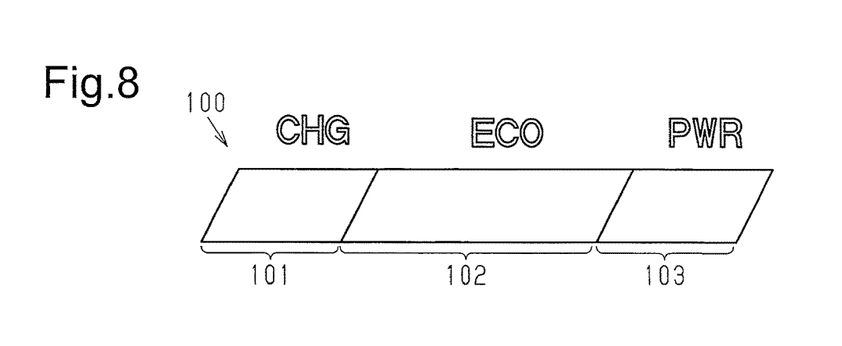
FIG. 8 shows, on the level meter shown in FIG. 4, a state in which assistance is ended.

As shown in FIG. 8, when a brake operation is performed after the vehicle 1 has passed through the deceleration start point P1, the indicator control section 72 determines that the assistance is finished, and hides the deceleration recommendation indicator 115. Even when a brake operation is performed between the indicator switch point P2 and the deceleration start point P1, the deceleration recommendation indicator 115 is not hidden. When the vehicle 1 has passed through the target position also, the deceleration recommendation indicator 115 is hidden.

Next, with reference to FIG. 9, a description will be given of the operation of the driving assistance apparatus 40 together with a procedure of a process of displaying the deceleration recommendation indicator 115. This process is performed separately from the process for displaying the regeneration state indicator 110, which represents the current regenerated electricity amount, the motor output indicator 111 in the ECO region 102, and the engine output indicator 112 in the PWR region 103.

First, the prediction section 50 of the driving assistance apparatus 40 predicts whether or not a target position is present ahead in the traveling direction of the vehicle 1, using at least one of the learning result of the prediction section 50, the infrastructural information, and the road map information 38 (Step S1). The prediction section 50 determines, for example, whether or not a target position is present ahead in the traveling direction of the vehicle 1 and within a predetermined distance or a predetermined average running time from the position of the vehicle 1 (Step S2).

When the prediction section 50 determines that a target position is not present (Step S2: NO), the prediction section 50 ends the process of displaying the deceleration recommendation indicator 115. In contrast, when the prediction section 50 determines that a target position is present (Step S2: YES), the prediction section 50 determines whether or not the vehicle speed can attain the target speed at the target position solely by regenerative braking by an accelerator-release operation (Step S3).

First, the prediction section 50 determines whether or not there is an available capacity equal to or greater than an available capacity predetermined for the electricity storage device 23. When the available capacity is less than the predetermined capacity, for example, when the electricity storage device 23 is nearly fully charged, the prediction section 50 determines that the vehicle speed cannot be decelerated to the target speed solely by regenerative braking by an accelerator-release operation (Step S3: NO), and ends the process of displaying the deceleration recommendation indicator 115.

When the available capacity is equal to or greater than the predetermined capacity, the prediction section 50 acquires the remaining distance from the current position of the vehicle 1 to the target position and the current vehicle speed, and calculates the deceleration required for decelerating the vehicle 1 in order for the vehicle 1 to arrive at the target position at the target speed. When the calculated deceleration is greater than the regenerative deceleration $\alpha$, the prediction section 50 determines that the vehicle speed cannot be decelerated to the target speed solely by regenerative braking by an accelerator-release operation (Step S3: NO), and ends the process of displaying the deceleration recommendation indicator 115.

When the calculated deceleration is equal to or smaller than the regenerative deceleration $\alpha$, the prediction section 50 determines that the vehicle speed can be decelerated to the target speed solely by regenerative braking by an accelerator-release operation (Step S3: YES). At this time, the prediction section 50 calculates the indicator switch time (Step S4). As described above, the indicator switch time is calculated by calculating the deceleration start point P1, which is the position where an accelerator-release operation needs to be started, and setting the indicator switch point P2 at a position short of the deceleration start point P1 by the response distance D2 (see FIG. 3).

When the driving assistance calculation section 60 has calculated the indicator switch timing, the driving assistance calculation section 60 calculates the predicted regenerated electricity amount E2 using the current vehicle speed. The driving assistance calculation section 60 calculates the proportion R2 of the predicted regenerated electricity amount E2 to the maximum regenerated electricity amount Emax (Step S5). The calculation of the proportion R2 (Step S5) may be performed prior to the calculation of the indicator switch time (Step S4).

The driving assistance calculation section 60 compares the current position of the vehicle 1 and the indicator switch point P2 against each other, and determines whether or not the vehicle 1 has reached the indicator switch time (Step S6). When the vehicle 1 has arrived at the indicator switch point P2, the driving assistance calculation section 60 determines that the indicator switch time has been reached (Step S6: YES), and causes the indicator control section 72 to display the deceleration recommendation indicator 115, which recommends an accelerator-release operation, by outputting the calculated proportion R2 and an output instruction to the indicator control section 72 (Step S7). The indicator control section 72 displays on the display section 71 the deceleration recommendation indicator 115 by the length corresponding to the proportion R2 calculated by the driving assistance calculation section 60.

When the deceleration recommendation indicator 115 is displayed, the driving assistance calculation section 60 determines whether or not the vehicle 1 has passed through the target position (Step S8). When the driving assistance calculation section 60 determines that the vehicle 1 has passed through the target position (Step S8: YES), the driving assistance calculation section 60 hides the deceleration recommendation indicator 115 (Step S10).

When the driving assistance calculation section 60 determines that the vehicle 1 has not passed through the target position (Step S8: NO), the driving assistance calculation section 60 determines whether or not a brake operation has been operated after the vehicle 1 has passed through the deceleration start point P1 based on presence/absence of signals input from the brake sensor 13 or the like (Step S9). When the driving assistance calculation section 60 determines that a brake operation has been operated after the vehicle 1 has passed through the deceleration start point P1 (Step S9: YES), the driving assistance calculation section 60 hides the deceleration recommendation indicator 115 (Step S10).

When the driving assistance calculation section 60 determines that the vehicle 1 has not passed through the deceleration start point P1, or that a brake operation has not been performed despite the vehicle 1 having passed through the deceleration start point P1 (Step S9: NO), the control returns to Step S7, and the driving assistance calculation section 60 causes the indicator control section 72 to keep displaying the deceleration recommendation indicator 115. At this time, the driving assistance calculation section 60 updates the predicted regenerated electricity amount E2 using the vehicle speed, thereby outputting the proportion R2 based on this predicted regenerated electricity amount E2 to the indicator control section 72. Thus, the driving assistance calculation section 60 causes the deceleration recommendation indicator 115 to be displayed by the length corresponding to the vehicle speed. When the vehicle 1 has entered a branch road not farther than the target position before the vehicle 1 passes through the target position, the driving assistance calculation section 60 ends the process of displaying the deceleration recommendation indicator 115.

The driver recognizes that a deceleration operation is recommended by firstly visually recognizing the deceleration recommendation indicator 115. By visually recognizing the deceleration recommendation indicator 115, the driver can obtain also the tendency of the magnitude of the regeneration amount brought about by the decelerating action for the target position. When the vehicle 1 is decelerated solely by an accelerator-release operation, the deceleration must be started at the time earlier than in the case where the vehicle 1 is decelerated by a brake operation.

Accordingly, the time of displaying the deceleration recommendation indicator 115 also tends to be earlier than the deceleration time supposed by the driver. Accordingly, by displaying the tendency of the magnitude of the regeneration amount by the driving assistance apparatus 40 by the length of the deceleration recommendation indicator 115, it becomes possible to inform the driver about the merit of deceleration by an accelerator-release operation, and prompt the driver to perform an accelerator-release operation.

When the driver has performed a brake operation before the vehicle 1 passes through the deceleration start point P1, the length of the regeneration state indicator 110 is differently displayed from the length of the deceleration recommendation indicator 115. Accordingly, while checking the relative distance to another vehicle, the driver cancels the brake operation or reduces the brake operation amount, to match the length of the regeneration state indicator 110 with that of the deceleration recommendation indicator 115. When the brake operation is canceled, the length of the regeneration state indicator 110 is matched with that of the deceleration recommendation indicator 115. Accordingly, the driver can determine that a brake cancelling operation has been recommended. When the brake operation continues even when the brake operation amount is reduced, the length of the regeneration state indicator 110 and that of the deceleration recommendation indicator 115 are different from each other. Accordingly, the driver can determine that a brake cancelling operation has been recommended.

Thus, until the vehicle 1 passes through the target position or a brake operation is performed after the vehicle 1 has passed through the deceleration start point P1, the deceleration recommendation indicator 115 is continuously displayed on the display section 71. Until the deceleration recommendation indicator 115 is hidden, the length of the deceleration recommendation indicator 115 varies in accordance with the vehicle speed. When the driving assistance apparatus 40 finishes assistance for one target position, the control returns to Step S1. Then, when the next target position is identified, the above-described process is repeated.

As described above, the driving assistance apparatus of the present embodiments achieves the following advantages.

(1) Since the length of the deceleration recommendation indicator 115 varies in accordance with the vehicle speed, the tendency of the magnitude of the regenerated electricity amount brought about by a decelerating action for a target position can be displayed. Accordingly, by visually recognizing the deceleration recommendation indicator 115, the driver can obtain the tendency of the regenerated electricity amount brought about by deceleration for a target position.

(2) The deceleration recommendation indicator 115 represents the regeneration amount per unit time when deceleration is realized solely by regenerative braking of the motor 24. Thus, by visually recognizing the deceleration recommendation indicator, the driver can accurately obtain the magnitude of the regeneration amount brought about by deceleration for a target position.

(3) When the driver of the vehicle 1 stops an accelerator operation, the regeneration state indicator 110 and the deceleration recommendation indicator 115 are displayed in the same manner, i.e., by the same length. Accordingly, by visually recognizing the regeneration state indicator 110 and the deceleration recommendation indicator 115 set to have the same length, the driver can determine that cancellation of an accelerator operation has been recommended. Accordingly, information for assisting at regenerative braking can be properly displayed.

(4) When the driver performs a brake operation after passing through the deceleration start point P1, which is the point where cancellation of an accelerator operation needs to be performed, the deceleration recommendation indicator 115 is hidden. Accordingly, for example when a brake operation is performed in accordance with the relative distance between the vehicle and a vehicle ahead, the assistance of recommending cancellation of an accelerator operation can be ended.

(5) When the vehicle 1 has passed through a target position that is the deceleration target, the deceleration recommendation indicator 115 is hidden based on the fact that the assistance of recommending cancellation of an accelerator operation has ended. Accordingly, the driver can intuitively determine that the deceleration recommendation indicator 115 is an indicator for assisting a decelerating action of the vehicle 1 for the target position.

(6) On the display section 71, the deceleration recommendation indicator 115 is displayed at the time when the driver, who has visually recognized the indicator of the deceleration recommendation indicator 115, performs cancellation of an accelerator operation, whereby the vehicle speed attains the target speed at the target position. Accordingly, when a driving operation is performed in accordance with the deceleration recommendation indicator 115, the time during which regenerative braking is performed can be increased, and the regenerated power amount can be increased. Reduction in use of the mechanical brake suppresses loss of kinetic energy of the vehicle 1 by being converted into heat. This also contributes toward increase in the regenerated power amount.

Other Embodiments

The above described embodiment may be modified as follows.

Figure 10:
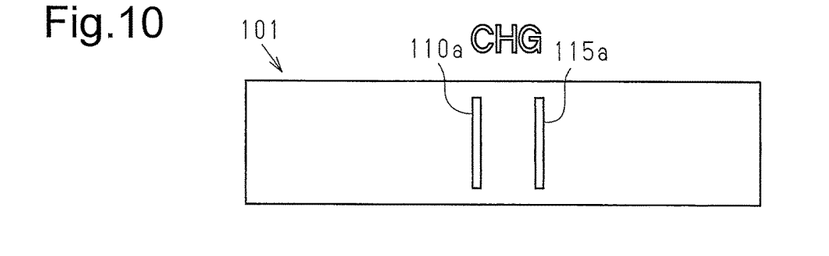
FIG. 10 shows a level meter according to a modification.

As shown in FIG. 10, a regeneration state indicator 110a, which represents the proportion R1 of the regenerated electricity amount E1 to the maximum regenerated electricity amount Emax, and a deceleration recommendation indicator 115a, which represents the proportion R2 of the predicted regenerated electricity amount E2 to the maximum regenerated electricity amount Emax, do not necessarily need to be displayed as bar-like graphs, but may be displayed by lines that move toward the right and left sides to represent values with reference to the right end, for example. With the accelerator released, for example, the position of the regeneration state indicator 110a and that of the deceleration recommendation indicator 115a are matched with each other to form one line.

Figure 11:
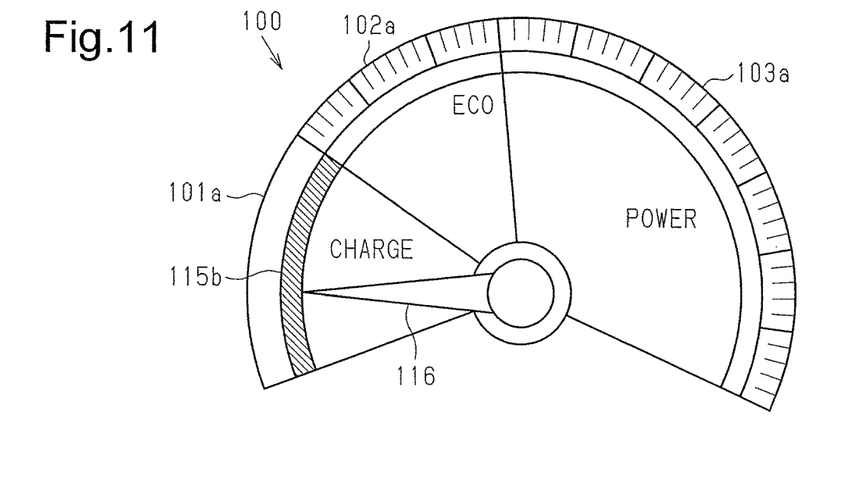
FIG. 11 shows a level meter according to another modification.

As shown in FIG. 11, in the level meter 100, a CHG region 101a, an ECO region 102a, and a PWR region 103a may be arranged such that their respective whole shapes are sectoral. In the CHG region 101a, the actual regenerated electricity amount E1 may be displayed by the position of a needle 116, and a deceleration recommendation indicator 115b, which represents the predicted regenerated electricity amount E2, may be displayed by an arc-shaped graph. The lower end of the CHG region 101a corresponds to 0 of the predicted regenerated electricity amount E2, and the upper end, which is the border between the CHG region 101a and the ECO region 102a, corresponds to the maximum regenerated electricity amount Emax. With the accelerator released, the position of the needle 116 corresponds to the upper end position of the deceleration recommendation indicator 115b.

The deceleration recommendation indicator may be an indicator representing the difference between the regenerated electricity amount E1 per unit travel amount brought about by execution of regenerative braking and the predicted regenerated electricity amount E2. With this configuration, when the driver performs a brake operation before passing through the deceleration start point P1, the deceleration recommendation indicator is displayed in a manner increasing the difference between the regenerated electricity amount E1 and the predicted regenerated electricity amount E2. When the driver has stopped an accelerator operation before a target position, the deceleration recommendation indicator is displayed in a manner indicating that there is no difference between the regenerated electricity amount E1 and the predicted regenerated electricity amount E2. By recognizing the deceleration recommendation indicator indicating that there is no difference between the regenerated electricity amount E1 and the predicted regenerated electricity amount E2, the driver can determine that cancellation of the accelerator operation has been recommended. Accordingly, information for assisting at regenerative braking can be properly provided.

Figure 12:
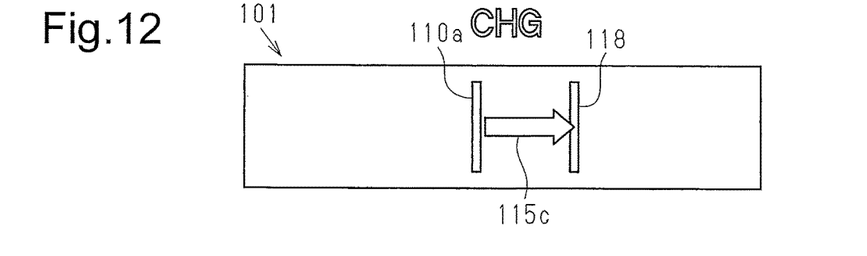
FIG. 12 shows a level meter according to still another modification.

For example, as shown in FIG. 12, the regeneration state indicator 110a, which represents the proportion R1 of the regenerated electricity amount E1 to the maximum regenerated electricity amount Emax, may be displayed by a line that moves toward the right and left sides, and the proportion R2 of the predicted regenerated electricity amount E2 to the maximum regenerated electricity amount Emax may be displayed by a line 118, which moves toward the right and left sides. Deceleration recommendation indicator 115c, which indicates the magnitude of the difference between the proportions R1 and R2, may be represented by an arrow indicator or the like. The length of the deceleration recommendation indicator 115c represents the difference between the proportions R1 and R2. With the accelerator released, the deceleration recommendation indicator 115 is hidden.

Figure 13:
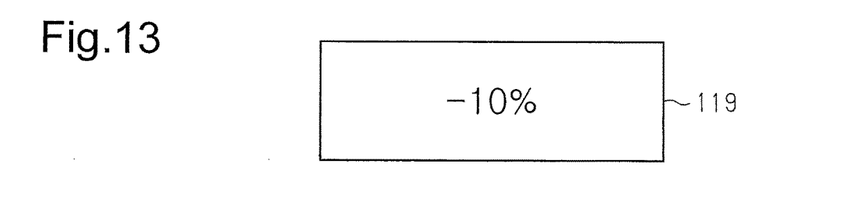
FIG. 13 shows a level meter according to still another modification.

As shown in FIG. 13, the difference between the proportion R1 of the regenerated electricity amount E1 to the maximum regenerated electricity amount Emax and the proportion R2 of the predicted regenerated electricity amount E2 to the maximum regenerated electricity amount Emax may be displayed by a numerical indicator 119. With the accelerator released, the numerical indicator indicates 0%. The difference between the regenerated electricity amount E1 and the predicted regenerated electricity amount E2 may be represented by a unit of, for example, kW or the like.

In the embodiment described above, when an accelerator-release operation is maintained after the deceleration recommendation indicator 115 is displayed, while the state where the length of the regeneration state indicator 110 and that of the deceleration recommendation indicator 115 are matched with each other is maintained, the length of the regeneration state indicator 110 and that of the deceleration recommendation indicator 115 are gradually reduced as the vehicle speed becomes lower. Alternatively, the deceleration recommendation indicator 115 may be maintained without having its length varied. In this case also, if the vehicle speed is maintained, then the length of the regeneration state indicator 110 and that of the deceleration recommendation indicator 115 are matched with each other when an accelerator-release operation is performed. Accordingly, the driver can understand that an accelerator-release operation has been recommended.

In the embodiment described above, when one of the conditions where the vehicle 1 has passed through a target position and where a brake operation is performed after the vehicle 1 has passed through the deceleration start point P1 is satisfied, the deceleration recommendation indicator 115 is hidden. Alternatively, when an accelerator operation is performed after the vehicle 1 has passed through the deceleration start point P1, the deceleration recommendation indicator 115 may be hidden. Thus, also in the case where an accelerator operation is performed when, for example, the distance from the following vehicle is short, the assistance can be ended.

In the embodiment described above, a target position is a traffic element such as an intersection, a railroad crossing, a place where a warning sign is posted, a curve with a small radius of curvature or the like. Alternatively, a target position may be a point short of such a traffic element. For example, a deceleration operation that needs to be performed for a traffic element such as an intersection may be determined to be both an accelerator-release operation and a brake operation. Then, firstly an accelerator-release operation for the target position may be recommended by the deceleration recommendation indicator 115, and after the vehicle speed attains the target speed at the target position, finally a brake operation may be recommended.

In the embodiment described above, the case where the prediction section 50 calculates the indicator switch point P2 based on the deceleration distance and the response distance is described as an example. However, without being limited thereto, the prediction section 50 may calculate the indicator switch time as the time that is taken for arriving at the target position P0. For example, the time calculation section may use, as the indicator switch time, a time that is obtained based on a deceleration time required for decelerating the current vehicle speed V1 to the target speed V2, and the response time from the time point where the driver recognizes the indicator recommending deceleration until the driver performs a deceleration operation.

In the embodiment described above, the case where the indicator switch time is calculated such that the vehicle 1 can arrive at a target position at a target speed is described as an example. However, without being limited thereto, the deceleration recommendation indicator for recommending deceleration solely by regenerative braking by an accelerator-release operation may be displayed to attain a target speed without setting any target position. For example, when there is a target speed suitable for the running environment, by indicating a deceleration recommendation indicator corresponding to the target speed on the display section 71, an accelerator-release operation can be recommended.

Figure 9:
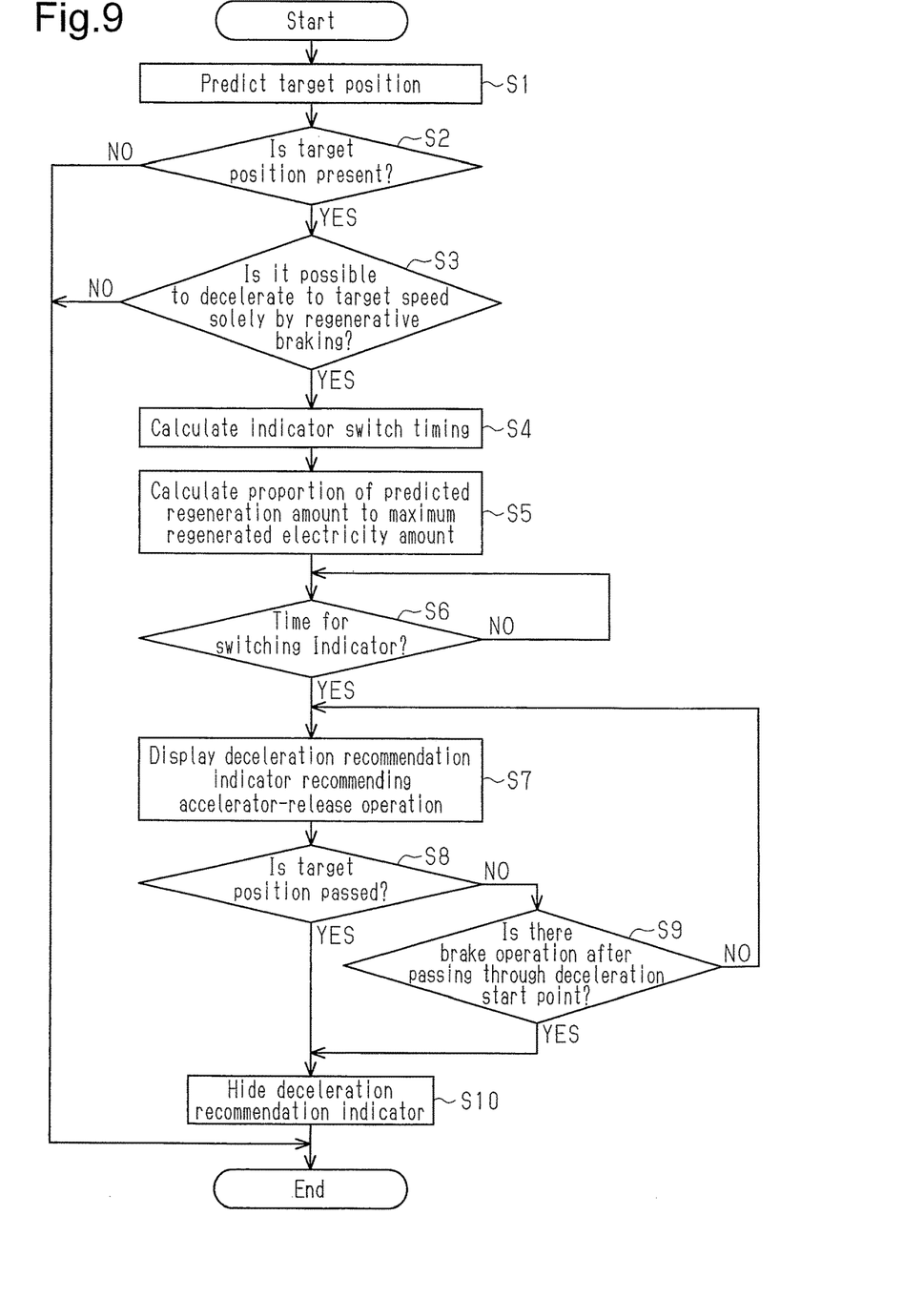
FIG. 9 is a flowchart showing a procedure of displaying the deceleration recommendation indicator on the level meter shown in FIG. 4.

In the embodiment described above, when there is no predetermined available capacity for the electricity storage device 23, it is determined that a target speed cannot be attained solely by regenerative braking of an accelerator-release operation (Step S3 in FIG. 9). Alternatively, it is also possible to compare a power amount that can be charged in the electricity storage device 23 based on the available capacity and a regenerated electricity amount obtained by multiplying the predicted regenerated electricity amount E2 by a running time to a target position against each other. Then, when the regenerated electricity amount exceeds the chargeable power amount or when the power amount that cannot be charged out of the regenerated electricity amount is equal to or greater than a threshold value, it may be determined that the target speed cannot be attained solely by regenerative braking by an accelerator-release operation.

In the embodiment described above, the driving assistance apparatus 40 calculates the regenerated electricity amount E1 and the predicted regenerated electricity amount E2 using Equation (3) and Equation (5). Equation (3) and Equation (5) are one example of operational expressions, and the regenerated electricity amount E1 and the predicted regenerated electricity amount E2 may be calculated using other expressions. It is also possible to derive the regenerated electricity amount E1 and the predicted regenerated electricity amount E2 without performing operations based on expressions, and using a map in which variables representing the running state such as a vehicle speed, a brake operation amount, an engine driving state and the like and a regenerated electricity amount are associated with each other.

The position detecting section 14 may include a structure of detecting the current position of the vehicle 1 using satellite signals other than the GPS or signals of the road-to-vehicle communication, in addition to or in place of GPS satellite signals.

In the embodiment described above, a regeneration amount obtained by regenerative braking of the motor 24 is represented by a power amount. However, it may be represented by braking torque of the motor 24 or in other sections.

In the embodiment described above, the deceleration recommendation indicator is used as an indicator intended to recommend decelerating by an accelerator-release operation for a target position through comparison with the regeneration state indicator. Without being limited thereto, the deceleration recommendation indicator may be simply used as an indicator intended to represent the tendency of the magnitude of the regeneration amount brought about by a decelerating action for a target position, without conducting a comparison with the regeneration state indicator.

For example, on a map screen covering around the current position displayed by the navigation system 32, the deceleration recommendation indicator representing the tendency of the magnitude of the regeneration amount brought about by a decelerating action for a target position may be displayed in a form of an icon or the like. That is, an icon representing the estimated regeneration amount brought about by deceleration for an intersection is overlaid on the position of the intersection ahead in the traveling direction of the vehicle on the map. Further, for example, the display manner of the icon is varied, for example the size thereof becomes greater or the color thereof becomes deep as the vehicle speed becomes higher. In this case also, for example in the case where a regeneration amount will become greater if the vehicle is decelerated at the timing earlier than the timing supposed by the driver, the driver can be prompted to decelerate by the deceleration recommendation indicator.

The deceleration recommendation indicator may be used as an indicator intended to represent the tendency of the magnitude of the regeneration amount brought about by a decelerating action for a target position, in a region of the console separately from the level meter 100. In this case also, the driver can obtain the tendency of the magnitude of the regeneration amount for a target position. The deceleration recommendation indicator may represent a regeneration amount per unit travel amount when deceleration is realized solely by regenerative braking of the motor by a deceleration operation including a brake operation. At this time, for example, the maximum regeneration amount that can be obtained solely by regenerative braking within a range where the brake mechanism 21 is not actuated may be displayed.

In the embodiment described above, the case where the position detecting section 14, the driving assistance apparatus 40, the navigation system 32, and the infrastructural communication device 15 are mounted on the vehicle 1 is described as an example. However, without being limited thereto, a part of the functions or the like of the position detecting section 14, the driving assistance apparatus 40, the navigation system 32, and the infrastructural communication device 15 may be provided outside the vehicle. For example, an external apparatus such as a mobile information processing apparatus may be equipped with a function replacing a part of the functions of the driving assistance apparatus 40, a part of or all the functions of the navigation system 32, the function of the infrastructural communication device 15, and the position detecting section 14. It is only required that the driving assistance apparatus is capable of acquiring necessary information from an external apparatus such as a mobile information processing apparatus.

In the embodiment described above, the case where the infrastructural communication device 15 and the navigation system 32 are mounted on the vehicle 1 is described as an example. However, without being limited thereto, so long as the driving assistance apparatus 40 can acquire a target position and a distance from the current position of the vehicle to the target position, at least one of the infrastructural communication device 15 and the navigation system 32 may be omitted from the vehicle 1. Further, for example a signal or a temporary stop position being a target position may be detected by a sensor such as an in-vehicle camera.

The prediction section 50 may be configured without the learning function, so long as it can determine a target position or the necessity for deceleration at a target position from an infrastructural information signal or the road map information 38.

The driving assistance apparatus 40 may be provided to the hybrid controller 25. By the calculation section of the hybrid controller 25, the processes performed by the prediction section 50 and the driving assistance calculation section 60 are executed. The driving assistance apparatus 40 may be provided to the navigation control section 36.

The hybrid vehicle may be supplied with electricity from an external power source. That is, the hybrid vehicle may be a so-called plug-in hybrid vehicle.

In the respective embodiments described above, though the vehicle is embodied as a hybrid vehicle in which the power of the engine 27 can be split by the power split mechanism 28, the vehicle may be a hybrid vehicle having a plurality of driving sources. For example, the vehicle may be a hybrid vehicle that switches connection between the engine 27 and the wheels and connection between the motor 24 and the wheels 5 by use of a clutch, in addition to the use of the power split mechanism 28. Further, the vehicle may be a hybrid vehicle on which a generator that generates electricity by the power transmitted from the front wheels, and a generator that generates electricity by the power transmitted from the rear wheel are mounted. Still further, the vehicle may be a hybrid vehicle that uses the power of the engine 27 solely for power generation, or a hybrid vehicle in which the engine 27 and the motor 24 are mechanically connected to the driving wheels, and their respective powers can be transmitted to the driving wheels in parallel.

The electricity storage device 23 is just required to be a power supply apparatus capable of charging and discharging. It may be a rechargeable battery, or may be an electricity storage device used in conjunction with a capacitor, for example.

In the embodiment described above, the case where the driving assistance apparatus is provided to a hybrid vehicle is described as an example. However, without being limited thereto, the driving assistance apparatus may be provided to an electric vehicle having a motor and a power supply apparatus. With an electric vehicle also, by suppressing use of the mechanical brake and prompting deceleration solely by regenerative braking of the motor, an improvement in power consumption and fuel consumption representing the energy efficiency can be achieved.

The invention claimed is:

1. A driving assistance apparatus, which assists a driver in driving a vehicle, the vehicle including: (i) a motor capable of regenerating power as a driving source, and (ii) an electricity storage device that is a power source of the motor and capable of being charged by regenerative braking of the motor, the driving assistance apparatus comprising:
 a processor programmed to:
  determine a deceleration recommendation indicator as an indicator for recommending deceleration of the vehicle, the deceleration recommendation indicator recommending deceleration of the vehicle for a target position ahead in a traveling direction of the vehicle, and the deceleration recommendation indicator continuously varying in accordance with a speed of the vehicle,
  determine a regeneration state indicator representing a state of regenerative braking of the vehicle, the regeneration state indicator continuously varying in accordance with braking force requested by the driver of the vehicle,
  if an accelerator operation of the vehicle is stopped, match a display configuration of the regeneration state indicator with a displaying configuration of the deceleration recommendation indicator, and
  output the deceleration recommendation indicator and the regeneration state indicator to a display section of the vehicle, wherein:
 the processor is configured to calculate a time of outputting the deceleration recommendation indicator to the display section by adding a second travel distance to a first travel distance traveled by the vehicle until the speed of the vehicle reaches a target speed, and
 the second travel distance is a travel distance traveled by the vehicle from when the deceleration recommendation indicator is output to the display section until the driver cancels an accelerator operation.

2. The driving assistance apparatus according to claim 1, wherein the processor is configured to display the deceleration recommendation indicator as a regeneration amount per unit travel amount when the vehicle is decelerated solely by regenerative braking of the motor.

3. The driving assistance apparatus according to claim 1, wherein the processor is configured to hide the deceleration recommendation indicator on condition that a brake operation is performed after the vehicle has passed through a point where deceleration needs to be started.

4. The driving assistance apparatus according to claim 1, wherein the processor is configured to hide the deceleration recommendation indicator on condition that the vehicle has passed through a target position that is a target of deceleration.

5. The driving assistance apparatus according to claim 1, wherein
 the processor is configured to hide the deceleration recommendation indicator on condition that a brake operation is performed after the vehicle has passed through a point where deceleration needs to be started, and
 the processor is configured to hide the deceleration recommendation indicator on condition that the vehicle has passed through a target position that is a target of deceleration.

6. The driving assistance apparatus according to claim 1, wherein
 the deceleration recommendation indicator continuously varies in accordance with a speed of the vehicle when: (i) the target position has not been passed, and (ii) a brake operation after passing through a deceleration start point has not been performed.

7. A driving assistance apparatus, which assists a driver in driving a vehicle, the vehicle including: (i) a motor capable of regenerating power as a driving source, and (ii) an electricity storage device that is a power source of the motor and capable of being charged by regenerative braking of the motor, the driving assistance apparatus comprising:
 a processor programmed to:
  determine a deceleration recommendation indicator as an indicator for recommending deceleration of the vehicle, the deceleration recommendation indicator recommending deceleration of the vehicle for a target position ahead in a traveling direction of the vehicle based on a difference between a predicted regeneration amount and a regeneration amount per unit travel amount by execution of regenerative braking of the vehicle, and the deceleration recommendation indicator continuously varying in accordance with a speed of the vehicle, and
  output the deceleration recommendation indicator to a display section of the vehicle, wherein:
 the predicted regeneration amount is a regeneration amount per unit travel amount when the vehicle is decelerated solely by regenerative braking by cancellation of an accelerator operation until reaching the target position,
 the processor is configured to calculate a time of outputting the deceleration recommendation indicator to the display section by adding a second travel distance to a first travel distance traveled by the vehicle until the speed of the vehicle reaches a target speed, and
 the second travel distance is a travel distance traveled by the vehicle from when the deceleration recommendation indicator is output to the display section until the driver cancels an accelerator operation.

* * * * *